United States Patent [19]

Hellweg et al.

[11] Patent Number: 5,523,109
[45] Date of Patent: Jun. 4, 1996

[54] OAT FLOUR AND METHOD OF PREPARATION

[75] Inventors: John H. Hellweg, Spring Park; Merle K. Larson, Dassel; Daniel J. Lewandowski, Bloomington, all of Minn.

[73] Assignee: General Mills, Inc., Minneapolis, Minn.

[21] Appl. No.: 260,580

[22] Filed: Jun. 16, 1994

[51] Int. Cl.$^6$ .................. A23B 9/02; A23B 9/08; A23L 1/10; A23L 1/164

[52] U.S. Cl. .................. 426/618; 426/620; 426/621

[58] Field of Search .................. 426/618, 620, 426/621

[56] References Cited

U.S. PATENT DOCUMENTS

| | | |
|---|---|---|
| 2,864,702 | 12/1958 | Murray et al. |
| 2,999,018 | 9/1961 | Huffman et al. |
| 3,490,915 | 1/1970 | Tressler |
| 3,494,769 | 2/1970 | Tressler |
| 3,520,695 | 7/1970 | Hanser et al. |
| 4,413,018 | 11/1983 | Webster .................. 426/618 |
| 4,603,055 | 7/1986 | Karwowski et al. |
| 4,861,614 | 8/1989 | Seaborn |
| 5,132,133 | 7/1992 | Huber et al. |
| 5,258,189 | 11/1993 | Efstathiou .................. 426/73 |
| 5,352,473 | 10/1994 | Chiqurupati et al. .................. 426/549 |

OTHER PUBLICATIONS

F. W. Collins, D. C. McLachlan, B. A. Blackwell, *Oat phenolics: avenalumic acids, a new group of bound phenolic acids from oat groats and hulls*, Cereal Chemistry, 69:184–189 (1991).

D. Meyer, H. Zwingelberg, *Laboratory trials on the suitability of oats for oat flake production*, Muehel & Mischfuttertechnik 117:469–472 (1980) (with English abstract).

K. Gerner, *Production and refining of ceral products*, Muehle & Mischfuttertechnik 116:638–639, 642 (1979) (with English abstract).

K. Liukkonen, *Improvement of lipid stability in aqueous processing of oats*, Publisher: Espoo, Finland; Helsinki Univ. of Tech., 1994 (English abstract only).

S. Dahl, H. Lingnert, U. Stoellman, *Oxidative stability of processed oats*, SIK Rapport 558 (1989) (with English abstract).

L. F. Stolyarova, P. A. Yaroshenko, E. M. Mel'nikov, V. V. Maneenkov, *Baking properties of oat flour following hydothermal processing*, Khlebopekarnaya i Konditerskaya Promyshlennost' 8:24–26 (1982) (with English abstract).

F. W. Collins, *Oat phenolics: avenanthramides, novel substituted N–cinnamoylanthranilate alkaloids from oat groats and hulls*, Journal of Agricultural and Food Chemistry, 37:60–66 (1989).

J. W. Mullin, F. W. Collins, *Purification and identification of alk(en)ylresorcinols*, Journal of Food Composition and Analysis, 4:270–275 (1991).

Frank Sosulski, Krzysztof Krygier, Lawrence Hogge, *Free, Esterified and Insoluble–Bound Phenolic Acids. 3. Composition of Phenolic Acids in Ceral and Potato Flours*, J. Agric. Food Chem. 30:337–340 (1982).

A. P. Mossman, W. C. Rockwell and D. A. Fellers, *Hot Air Toasting and Rolling Whole Wheat Effect on Organoleptic, Physical and Nutritional Quality*, Journal of Food Science, 38:879–884 (1973).

A. B. Durkee and P. A. Thivierge, *Ferulic Acid and Other Phenolics In Oat Seeds*, Journal of Food Science, 42:551–552 (1977).

L. H. Dimberg, O. Theander and H. Lingnert, *Avenanthramides—a group of phenolic antioxidants in oats*, Cereal Chemistry 70:637–641 (1993).

D. Meyer, H. Zwingelberg, A. W. El–Baya, *Experimental production of oat flakes with the micronizer*, Getriede, Mehl und Brot 36:259–263 (1982).

U. Meister, G. Schramm, H. Symmank, *Determination of activities of lipase, lipoxygenase and peroxidase in native and extruded cereal brans*, Zeitschrift fuer Lebensmittel-Untersuchung und– Forschung 199:275–280 (1994).

B. Ekstrand, I. Gangby, G. Akesson, *Lipase activity in oats—distribution, pH dependence, and heat inactivation*, Cereal Chemistry 69:379–381 (1992).

B. Fretzdorff, K. Seiler, *The effects of twin–screw extrusion cooking on cereal enzymes*, Journal of Cereal Science 5:73–82 (1987).

P. R. Chang, F. W. Sosulki, *Functional Properties of dry milled fractions from wild oats*, Journal of Food Science 50:1143–1147, 1157 (1985).

M. G. Heydanek, R. J. McGorrin, *Gas Chromatography Mass Spectroscopy Investigations on the Flavor Chemistry of Oat Avena–Sativa Groats*, J. Agric. Food Chem 29:950–954 (1981).

(List continued on next page.)

Primary Examiner—Donald E. Czaja
Assistant Examiner—Choon P. Koh
Attorney, Agent, or Firm—John A. O'Toole; L. MeRoy Lillehaugen

[57] ABSTRACT

Improved conditioned whole grain oat flours are provided for the improved production of whole grain Ready-To-Eat breakfast cereals, especially puffed. Whole oat groats are steamed for greater times, dry toasted for extended times and milled to provide the present conditioned oat flour. The oat flours have minimal peroxidase activity and a ratio of the HPLC syringic acid peak to ferulic acid peak, of about $\geq 2.5$ which ratio is characteristic of a toasted flavor attribute. The conditioned oat flour has a Farinograph cook or development time value of about five to 25 minutes indicating partial gelatinization or partial precooking.

Employment of the specially conditioned oat flour allows for the production of cooked whole grain oat based cereal doughs having improved desired cooked cereal flavors in traditional extended cook time cereal cookers in reduced times thereby increasing production rates. Also, employment of the present oat flours allows for the production of puffed whole grain oat R-T-E cereals from short residence time cooker extruders which nonetheless have a cooked cereal grain flavor including even by direct expansion.

36 Claims, 1 Drawing Sheet

OTHER PUBLICATIONS

Thomas H. Parliment, Robert J. McGorrin, Ho Chi-Tang, *Thermal Generation of Aromas,* ACS Symposium Series 409 (1988).

S. Dahl, H. Lingnert, U. Stoellman, *Oxidative stability of processes oats,* SIK Rapport 558 (1989).

"Thermal Decomposition of Ferulic Acid" J. Agr. Food Chem. vol. 15, No. 5, pp. 757–760.

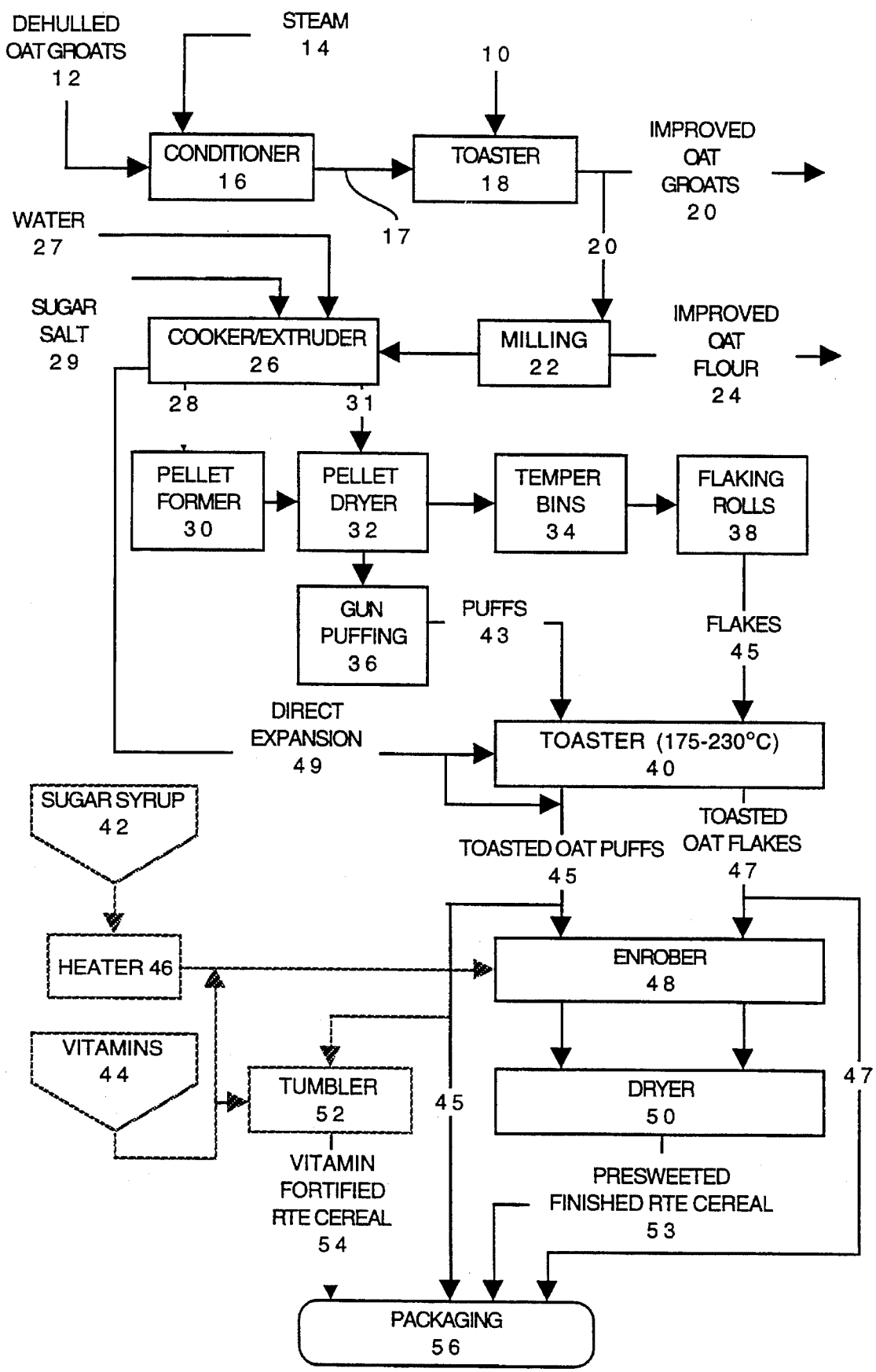

OAT FLOUR AND METHOD OF PREPARATION

TECHNICAL FIELD

The present invention relates to food products and to their methods of preparation. More particularly, the present invention relates to improved oat and oat flour products and to their heat treatment methods of preparation.

BACKGROUND OF THE INVENTION

Oat based cereal products for human consumption primarily include grain flakes and oat flour although other specialty oat based or oat derived products are also known. Grain flakes of various sizes are used for oatmeal, granola products, and as topical additives for various products, especially for breads. The processing of oat groats for forming into oat flakes is substantially different than for the preparation of a whole grain oat flour.

In prior oat flour production, dehulled oats or oat groats are steamed for enzyme inactivation and then milled to form a shelf stable whole grain oat flour. The oat flour can be subsequently processed to form cooked cereal doughs which in turn are fabricated into R-T-E cereals of various types including flakes, biscuits, and importantly, puffed R-T-E cereals. The puffed R-T-E cereals can be of the popular ring shape or fabricated into other shapes, such as alphabet letters or animal shapes. By "whole grain oat flour" is meant herein an oat flour including its oil component obtained from dehulled oat groats.

Processing for the provision of puffed whole grain oat based R-T-E cereals from cooked cereal doughs is particularly complex due to the multiplicity of problems of providing a whole grain R-T-E cereal in general, a puffed whole grain R-T-E cereal, and/or an oat based R-T-E cereal in particular, whether flaked or puffed. For example, one particular problem is that whole grain oat based cooked cereal doughs are notoriously difficult to puff possibly due to the high levels of fat and soluble gums, e.g., beta glucan. A second particular problem is that whole grain oat based R-T-E cereal products experience particularly severe stability problems due to the fat content. For these reasons, some puffed oat based R-T-E cereal products are prepared from defatted oat flour or are merely whole oat flour containing (i.e., have high levels of added starch or other cereal materials). Because of the difficulties of producing a puffed whole oat piece from cooked cereal dough pellets, gun puffing is used since gun puffing is the most vigorous form of cereal pellet puffing.

A general problem in providing a puffed R-T-E cereal resides in the provision of an R-T-E cereal having the desirable "cooked grain" flavor. Many cereals can be cooked to gelatinize the starch component in a relatively short period of time. However, the imparting to the cooked cereal dough of a "nutty" or cooked grain flavor requires extended cook times. Traditional batch or semi-continuous cereal cookers can provide the requisite lengthy residence or long cook times to develop the desired "cooked grain" flavor feature.

Unfortunately, however, traditional cookers used in the manufacture of whole grain based puffed R-T-E cereal products are very expensive. Thus, it would be highly desirable to be able to either increase the output of such cereal cookers by reducing the required cook time needed to produce a desired level of cooked cereal flavor or to increase the desirable cooked flavor for a given cook time in such traditional long cook time cereal cookers.

Moreover, cooker extruders, whether single screw or double screw are increasingly popular, especially in the production of directly expanded R-T-E cereal products. However, since the residence time in the cooker extruder is so short, (e.g., 0.5 to eight minutes) the cooked cereal dough produced often is characterized as having an "uncooked" or "green" flavor rather than the desirable "cooked" or "nutty" flavor. Adding flavor additives to rectify the flavor deficiency is both expensive and marginally effective. Of course, the residence time in the cooker extruder can be increased modestly to further develop desirable flavor. However, the increase in the residence time in the cooker extruder also increases the amount of work imparted to the cooked cereal dough. As the cooked cereal dough is worked more, the texture is adversely affected leading to a pasty finished product having an undesirable eating texture.

In direct expansion, the finished puffed products are produced directly from the cooker extruder thereby eliminating such conventional intermediate steps as dough tempering, pellet forming, pellet drying, and gun puffing of the pellets. By avoiding these intermediate steps, the cost of producing the finished R-T-E cereal is dramatically reduced.

Due to the difficulty in developing cooked grain flavors in whole oat based R-T-E cereal doughs, cooker extruders have not been used for the preparation of direct expanded puffed whole grain oat R-T-E cereals.

Surprisingly, in the present invention it has been found that by extending the steaming step and by adding a particular selected heat treatment of the oat groats prior to milling into a flour, that an improved high flavor, and partially cooked oat flour product can be prepared. Utilization of this high flavor, partially cooked oat flour can be used in conventional cereal processing with shorter cook times to produce finished R-T-E puffed whole grain oat cereal products having a desirable "nutty" cooked cereal flavor. By utilization of such an improved oat flour, increases in cereal processing outputs of up to 10% or more can be obtained without a loss in desirable end product flavor quality.

More surprisingly, the improved whole grain oat flour can also be used in short cook time cooker extruders to produce whole oat grain based puffed R-T-E cereals of desirable texture and flavor properties. Even more surprisingly, directly expanded puffed whole grain oat based R-T-E cereals can be prepared which nonetheless exhibit high levels of cooked grain flavor.

SUMMARY OF THE INVENTION

In its primary method aspect, the present invention resides in methods for providing an improved conditioned whole oat flour having improved flavor and degree of cook. The present methods involve A) steaming oat groats; B) heat treating the steamed oat groats to obtain a conditioned oat groat; and C) milling the conditioned oat groat to form a whole grain oat flour. The flour has a ratio of the HPLC syringic acid peak to ferulic acid peak of $\geq 2.5:1$, and a Farinograph cook time value of about five to 25 minutes.

In its primary product aspect, the present invention resides in improved conditioned whole grain oat flours suitable for use in the preparation of whole grain oat based R-T-E cereal products. The whole grain oat flour is essentially characterized in part by a Farinograph cook time value ranging from about five to 25 minutes. The oat flour additionally is essentially characterized by a ratio of the HPLC syringic acid peak to ferulic acid peak of about ≧2.5:1.

The present invention further provides methods for making an improved R-T-E cereal employing the present improved oat flour. These methods additionally comprise the steps of D) adding the flour with water and minor R-T-E cereal ingredients; E) cooking to form a cooked cereal dough; and F) forming the cooked cereal dough into a finished R-T-E cereal.

In additional product aspects, the present invention provides improved conditioned oat groats for use in milling operations to produce an improved whole grain oat flour for use in the production of R-T-E cereals.

BRIEF DESCRIPTION OF THE DRAWING

FIG. 1 is a block flow diagram of the present invention illustrating the preferred embodiment of the present invention including several variations thereof. Certain optional variations are indicated by dashed lines.

DETAILED DESCRIPTION OF THE INVENTION

The present invention provides improved conditioned oat groats, improved whole grain oat flour and methods for their preparation as well as methods for the preparation of R-T-E cereals made from such improved oat products. Each of the method steps as well as product use are described in detail below.

Throughout the specification and claims, percentages are by weight and temperatures in degree Fahrenheit unless otherwise indicated.

Referring now to the drawing, there is shown the preferred embodiment of the present process for preparing an improved whole grain oat flour generally designated by reference numeral 10. The methods 10 essentially comprise a first step of A) exposing dehulled oats or oat groats, whether whole or sectioned pieces, to steam, such as in conditioner 16, for sufficient times to deactivate their enzyme activity to provide a steamed enzyme inactivated or "conditioned" oat groat 17. The oat groats 12 starting material generally will have an initial moisture content ranging from about 8 to 10%. The steam injection conditioning step is designed primarily to inactivate the enzymes including lipase, lipoxigenase, peroxidase, amylase, and protease. The conditioned oat groats will have a negative peroxidase activity as measured by AAAC test method 963.27 (American Association of Cereal Chemists, 15th Ed., 1990). The steamed oat groats have a moisture content increased to about 16 to 25% by virtue of moisture absorption from the steaming exposure step.

Generally, the step involves heating for about 10 to 15 minutes using steam at about 5 to 20 psig (120 to 150 KPa).

Thereafter, the present methods essentially comprise the step of B) dry heating the steamed oat groats 17 such as by indirect steam contact to 185° to 230° F. (85° to 110° C.) in an appropriate vessel such as in toaster 18 for about 70 to 110 minutes to provide a conditioned and toasted oat groat 20. By virtue of the extended heat treatment, the oat groat moisture content is reduced to about 9 to 14%. The steamed, enzyme deactivated oat groats 17 are heated to lessen the energy requirements for cooked dough development and to develop a cooked flavor in the groats. Sufficient cooking is indicated by a Farinograph cook time value of about five to 25 minutes. For those flours to be used in cooker extruders such as a twin screw extruder better results in terms of reductions in needed duration of subsequent cook times is obtained when the Farinograph cook time value ranges from about five to eight minutes, while for extended cook time cookers, better results are obtained when the Farinograph cook time ranges from about 14 to 20 minutes.

A Farinograph measurement is a standard test method by the American Association of Cereal Chemists: AACC test method 54-21. The present cook or development time is a modification of the AACC test except that 1) the oat flour herein is used in substitution for wheat flour, and 2) the start point is developed at 95° C. rather than room temperature. Generally, a Farinograph is used to measure the torque required to mix oat flour dough at heated temperature. The time needed to develop maximum torque indicates the level of energy input required to form a cohesive dough. A shorter dough development or cook time in the Farinograph is indicative of a higher level of steam pretreatment.

In preferred embodiments (not depicted), the dry heating or toasting step includes a first substep of 1) venting the steam to form steamed and vented oat groats. The venting reduces the moisture content to about 15 to 20%. Thereafter, the dry heating step can include a second substep of dry heating the steamed and vented oat groats to form the steamed and toasted oat groats. The step can be practiced employing indirect steam or other dry heating technique. The dry heating technique is continued to yield the finished conditioned oat groat having a moisture content of about 9 to 14%. The skilled artisan will appreciate that the process can be practiced employing multiple vessels or a single vessel (e.g., gravity fed) having multiple sections or chambers.

Dry heating as used herein means heating only in the presence of any moisture which may be inherently present in the flour as a result of the prior steaming step but not in the presence of any additional or added moisture nor in the presence of a humid atmosphere, i.e., ≧40% relative humidity.

The finished steamed and toasted oat groats 20 result in a cooked cereal flavor in the resulting flour. The oat groats are further essentially characterized by a ratio of specific phenolic acids of about ≧2.5, preferably ≧3. One analytical method utilized to act as a marker for this flavor development is the HPLC (high performance liquid chromatography) area ratio of specific phenolic acids of ≧2.5. Specifically, the numerator is HPLC area for the syringic acid peak combined, and the denominator is ferulic acid peak area determined by HPLC retention times. The numerator area corresponds to concentration asnd has to this point been observed to range from about 10 to 35 ppm and the denominator will range from about 4 to 7 ppm. The syringic acid peak (including its associated phenolic ester having an HPLC elution time of 0.7 minutes differential) has been observed to be positively correlated with increased heat treatment of the oat groats while the ferulic acid level remains fairly level. Thus, increased heat treatment or toasting results in greater flavor development and in a greater amount of phenolic ester and a larger ratio value.

The dry heating will continue to gelatinize the starch, but the primary function of the heating process is to toast the oat groat to generate a distinct toasted flavor. The toasted flavor in the oat flour will impart desirable flavor to the extruded cereal products. To ensure proper toasting, the moisture content and heated temperature of the oat groats, as well as the heating time play important factors. In general, the moisture content of the oat groats entering the heating zone (after venting) should be in the range of 15 to 20%. The heating temperature of the oat groats should be in the range of 185° to 230° F. The heating time is in the range of 70 to 110 minutes.

As indicated in FIG. 1, the present invention further provides an improved intermediate product, namely, improved oat groats 20. The improved oat groats 20 are useful as an intermediate material that can be further processed by subsequent milling to form the present improved oat flour. While some plant production facilities are integrated to provide both steam treatment of oat groats and milling to produce oat flours, some production facilities are designed to perform either the steam treatment or the milling steps.

The present methods additionally comprise the step of thereafter C) milling 22 the steamed and toasted oat groats 20 to form the present improved oat flour 24.

In the R-T-E cereal preparation aspect of the present invention, the present methods additionally can comprise the step of D) combining the improved oat flour 24 with water 27 and minor amounts of other ingredients 29, (e.g., salt(s), sugar, starch) and E) cooking in a cooker 26 to form a cooked whole grain oat cereal dough 28. The cooked cereal dough 28 will have a moisture content of about 12 to 35%. Broadly, the present methods further comprise the step of F) forming the cooked cereal dough 28 into a finished R-T-E cereal. As depicted in FIG. 1, a variety of embodiments and variations within embodiments of various substeps can be used to practice the broad steps.

For example, in one preferred embodiment, conventional extended cook time cereal cookers are employed to prepare the cooked cereal dough 28. In this embodiment, cook times can range from about 30 to 70 minutes at 200° to 230° F. (93° to 110° C.) representing a 5 to 15% reduction in cook times compared to conventional processing. Notwithstanding the reduced cook times, the oat based cooked cereal doughs 28 are characterized by the desired cooked flavor characteristic of an extended cooked cereal dough.

In this preferred embodiment, step F can comprise the substep of 1) forming the dough 28 into pellets in a pellet former 30. In one variation the pellets can be thereafter 2) dried to a moisture content of about 8 to 14% in a pellet dryer 32 and then 3) puffed 36 (e.g., gun puffed) to form puffed whole grain puffed pieces 43. The puffed cereal pieces 43 can also be 4) toasted in toaster 40 to further develop a toasted oat flavor to form toasted oat puff pieces 45.

In another variation of this embodiment, the dried pellets are optionally tempered in temper bins 34 or equivalently on temper belts and then flaked, such as with flaking rolls 38 to form wet oat flakes 45 having a moisture content of about 12 to 18% and then toasted in toaster 40 to tenderize and partially expand the flakes to form toasted oat flakes 47.

In another embodiment, the oat flour 24 is combined with minor amounts of the other R-T-E cereal ingredients 29 and water 27 and cooked in a short time cooker extruder 26, whether a single screw or twin screw extruder, for about 0.5 to eight minutes and mechanically worked to form the cooked cereal dough 28. In preferred embodiments, the present whole grain oat flour comprises 80%> of the dough (dry weight basis). The dough can optionally include a variety of starches or other farinaceous materials. In one variation of this embodiment, the cooked cereal dough 28 is similarly processed as described above to produce either an oat flaked product 47 or a puffed oat product 43, including a toasted puffed oat product 45. The cooked dough 28 can be fed to a pellet former 30 or the cooker extruder 26 can be equipped with a pellet forming die head to form pellets 31 which are fed directly to the pellet dryer.

In another variation, the cooked cereal dough 28 is extruded under conditions of temperature and pressure and through appropriately shaped and sized dies so as to cause an immediate expansion or puffing of the cooked cereal dough upon extruding to ambient conditions or "directly expanded." The directly expanded puffed oat cooked cereal dough is then face cut to form individual pieces 49. The puffed pieces can be any suitable size and shape such as letters or as ring shaped pieces. The individual puffed cereal pieces 49 can optionally be toasted to impart a desirable further developed toasted oat flavor to the puffed pieces 48 whether by radiant heating, hot air and/or high intensity microwave heating. It is a surprising advantage that the present oat flours can be used to produce by direct expansion high whole oat flour (i.e., 80%>, dry weight basis) puffed cooked cereal dough pieces 49 having a high toasted grain flavor. Thereafter, the oat puffed pieces or flakes, whether dried or toasted to 2 to 6% moisture, can be directly packaged 56 for sale to consumers.

It has been previously known that oat material containing cooked cereal doughs can be directly expanded. However, the doughs in prior known methods suffered from one or more deficiencies including using oat flour ingredients that are defatted, or high levels of starch, or lack of cooked grain flavor, or had an undesirable texture due to overworking the cereal dough in the cooker extruder.

In another variation, the oat pieces, whether puffed 45 or flaked 47 and/or toasted, can be presweetened by topically adding a sugar syrup sweetener composition 42. In this embodiment, the cereal pieces or cereal base, (45, 47) can be charged to an enrober 48 and the sugar syrup 42 heated in heater 46 is topically applied thereto. The enrobing tumbling action is continued for a few minutes to evenly coat the cereal base (45, 47). If desired, various particulates such as nut pieces, fruit bit pieces, bran, or other topical additives (not shown) can be added to the enrober 48. A vitamin solution 44 optionally can also be added to the cereal base such as by adding to enrober 48 such as by in line admixing with the heated sugar syrup 42 or by separately spraying in the enrober 48. The coated cereal base 49 whether puffed, flaked, shredded, biscuit, shredded biscuit, cut dough sheet pieces, or other forms is then dried in dryer 50 to a final moisture content of about 2 to 5% to remove the added moisture associated with the sugar syrup 44 to form a presweetened finished R-T-E cereal 53. The finished cereal 53 is then conventionally packaged 56 for distribution and sale to customers.

The oat flour development time (or "Cook Times") values are measured using the following equipment and procedures. A dough made of oat flour and water is developed and cooked at 95° C. in a Brabender Do-corder (Brabender Do-corder Zype PL-V340 or equivalent equipped with a type 2-16-000 mixer/measuring head blade speed ratio/ drive-to-driven:3.2) with sigma type blades (type SB). The Do-corder is colloquially referred to by cereal chemists as a Faringograph. The changes in the oat dough rheological properties that occur during the analysis reflect the relative energy required to form a cohesive dough with the particular oat flour sample recorded on the Do-corder chart provide a functionality finger-print.

DESCRIPTION OF TYPICAL TEST

A 60 gram oat flour sample is transferred to the measuring head/mixing bowl. The bowl temperature is 95° C. and the two paddles inside the bowl are rotating, with the test speed set at 100 rpm. A block, with a port for the addition of water, is placed in the opening of the mixing bowl to prevent the evaporative loss of the moisture in the flour. The chart pen recording the resistance on the rotating paddles as a function of test time is set to the baseline (0 Consistency Units). The flour is given 150 seconds to heat. At the end of the 150 seconds, 25 milliliters of water is added through the port in the mixing bowl block. As an oat dough begins to form, the chart pen raises off the baseline to a height of 400 to 600 Consistency Units. An initial mixing peak viscosity is obtained within one minute of the addition of the water. After reaching a peak, the viscosity gradually declines for the next three to 15 minutes and reaches a minimum of 250 to 350 Consistency Units (The Trough Viscosity). At this point the dough viscosity begins to increase. At eight to 25 minutes into the analysis, the viscosity will peak at 380 to 420 Consistency Units and begin to decline. The test is concluded at this point. The Farinograph plot from the chart recorder will show two peaks. The first peak is the mixing peak and the second peak is the development peak. The Cook Time or development time as used herein is defined as the time point at which the increasing dough consistency portion of the development peak first reaches the dough consistency plateau value, or more simplistically, when the second viscosity increase ceases. The cook time decreases with increased degree of pretreatment. (Less than 15 minutes, higher level of pretreatment; 15 to 22 minutes, moderate level of pretreatment; greater than 22 minutes, low level of pretreatment).

Test Parameters
1. Test Speed is 100 pm.
2. Sensitivity Selection is 1:5.
3. Zero Suppression is set to 0.
4. The oil bath controlling the measuring head mixing bowl temperature is set to 95° C. The temperature of the bowl as measured by a thermometer will be 94.5° to 95° C.
5. The sample size is 60 grams of oat flour and 25 mls of distilled water assuming an oat flour moisture of 12% WB. The sample size for an oat flour with a known moisture can be obtained from the attached chart.

Procedure
1. Obtain at least 130 grams of the oat flour sample. Determine a moisture content using a certified secondary moisture method.
2. Using the attached chart, weigh out the appropriate mass of the oat flour sample (+0.05 to 0.1 grams to compensate for flour which will adhere to weigh boat).
3. Set the chart on the Do-corder to a 17 minute mark on the x axis of the graph. At this point ensure that the instrument is set to the appropriate test parameters and mixing bowl is securely in place and has reached 94.5° C.
4. Begin the transfer of the oat flour to the bowl. The transfer should be complete within one minute. (The chart will be at the 18 minute mark.) Using the zero adjustment, establish a baseline of 0 Consistency Units at this point.
5. Add the appropriate amount of water. The water addition should be complete within 30 seconds.
6. The dough viscosity will initially peak near the 0 minute mark on the chart recorder. The viscosity will then gradually decline, and then increase to reach a second peak somewhere between eight to 30 minutes after the 0 minute mark. The test can be terminated three minutes after this second peak is obtained.
7. Trough Viscosity: Find the lowest viscosity obtained after the initial mixing peak and before the second peak. Read the Consistency Units value from the center of the line on the chart.

Peak Viscosity
Find the highest viscosity obtained during the second peak. Read the Consistency Units value from the center of the line on the chart.

Cook Time
Draw a straight line through the center of the line on the chart through the peak viscosity and value obtained 30 seconds after the peak viscosity. The Cook Time is defined as the earliest point in time at which the drawn line intersects the center of the chart recorder line.

EXAMPLE 1

Conditioned oat groats and a whole grain oat flour of the present invention were obtained by the following method. Oat groats were loaded on the top of the conditioner 16 at a rate of 150 lb/min. Steam (15 psig, 180 KPa) was injected into the conditioner at a rate of 1400 lb/min at a point about 4–5 ft below the top of the conditioner 16. The resident time of the steam injection was about 13 minutes. The oat groats 12 traveled downward by gravity. Following steaming, the steamed groats were heated by radiator type of steamed heater 18. The temperature of the groats reached about 215° F. The heating time was about 42 minutes. After the heating, the excess steam was vented through the side ports. The groats received continuous heating treatment for an additional 80 to 85 minutes. Typically, the oat groat temperature through the heating sections was in the range of 185° to 220° F. After heating, the grains were cooled to room temperature and tempered overnight. Oat flour was produced by grinding the conditioned oat groats following standard oat flour milling practice to obtain a whole grain oat flour. Several analytical tests were performed to measure the quality. The results were:

| | |
|---|---|
| peroxidase activity | negative |
| Farinograph cook time: | 16 minutes |
| soluble phenolic ratio: | 3 |

The methanol soluble phenolic ratio of the syringic acid peak in the numerator and ferulic acid peak in the denominator was determined by high performance liquid chromatography (HPLC) as follows. A 5.00 g sample of oat flour is weighed into a centrifuge tube, and 25 ml of HPLC grade methanol is added. The sample is homogenized for specifically 30 seconds with an homogenizer at a rate of 25 to 30, e.g., using an Ultra Turrex™ homogenizer. Each sample is cooled in the refrigerator for a minimum of 15 minutes, and then centrifuged at full speed (3500 rpm) on an IEC HN-SII centrifuge for five minutes. The methanol is poured off into a round bottom flask and evaporated under reduced pressure at 25° to 30° C. until an oily residue remains. The residue is dissolved in 1 mL of HPLC grade methanol, and analyzed by HPLC. HPLC conditions are as follows:

| Parameter | Value |
|---|---|
| Wavelength | 280 nm |
| Sampling Rate | 2 points/second (minimum) |
| AUFS | 100 |
| Filter Time Constant | 1.0 sec |
| High Pressure Limit | 2800 psi–3000 psi |
| Helium Sparge Rate | 25 mL/min (minimum) |
| Initial Flow Rate | 1.00 mL/min |

Analysis of phenolic compounds by HPLC requires the use of a gradient pumping system. The gradient profile for this analysis is shown in Table 3. Curve 6 listed in this table corresponds to a linear gradient. A 10 μL aliquot is injected onto a C18 reverse phase column (Waters Nova Pack, 4 μm, 3.9×150 mm), and the gradient listed below is utilized.

| Time (min) | Flow Rate (mL/min) | Curve | % B (Methanol) | % C (2.5% Acetic Acid in Water) |
|---|---|---|---|---|
| Initial | 1.00 | — | 0 | 100 |
| 30 | 1.00 | 6 | 50 | 50 |
| 30–31 | 1.00 | 6 | 50 | 50 |
| 31–40 | 1.00 | 6 | 0 | 100 |

There are several peaks that elute during the phenolic HPLC run of the oat flour extract. One peak has a retention or elution time corresponding to syringic acid (15 minutes) and this phenolic ester was observed to increase with increased heat treatment. The other peak has a retention time (21 min) corresponding to that of ferulic acid and this compound remains fairly consistent in the amount eluting. The ferulic peak is used as a natural internal standard. The peak area ratio of syringic acid peak (including the associated phenolic ester) to ferulic indicates heat treatment level of oat groats.

EXAMPLE 2

An oat flour of the present invention was produced similarly as in Example 1. However, some modifications of the conditioning process were made. The feed rate of the groat was reduced to 150 lb/min. The steam injection rate was reduced to 1200 lb/min. The analytical results for the oat flour were:

| peroxidase activity: | negative |
|---|---|
| Farinograph cook time: | 18 minutes |
| soluble phenolic ratio: | 3.2 |

EXAMPLE 3

The oat flour was produced similarly as in Example 1 with some modifications on the conditioning process. The heating temperature of the oat groats was reduced to 165° F. The resulting oat flour had the following characteristics.

| peroxidase activity: | negative |
|---|---|
| Farinograph cook time: | 22 minutes |
| soluble phenolic ratio: | 2.2 |

The oat flour was judged to be unacceptable flour because both Farinograph cook time and phenolic ratio were outside the desirable ranges for flavor and cook time or development time.

What is claimed is:

1. A method for preparing improved conditioned oats, comprising the steps of:
   A. exposing oat groats having a native level of peroxidase activity to steam for sufficient time to deactivate the peroxidase enzyme activity to provide steamed oat groats having a moisture content of about 16 to 25%;
   B. heating and venting the steamed oat groats at about 85° to 110° C. for a period of time sufficient to provide vented steamed oat groats having a moisture content of about 15 to 20%; and,
   C. dry heating the vented steamed oat groats at about 85° to 110° C. (185° to 230° F.) for about 70 to 110 minutes to provide steamed and toasted oat groats having a moisture content of about 9 to 14%.

2. The method of claim 1 wherein the steamed and toasted oat groats have a Farinograph value of about five to 25 minutes.

3. The method of claim 1 wherein the steamed and toasted oat groats have a ratio of the HPLC syringic acid peak to ferulic acid peak of $\geq 2.5$.

4. The method of claim 1 wherein the steamed and toasted oat groats have a Farinograph value of about five to eight minutes.

5. The method of claim 1 wherein the steamed and toasted oat groats have a Farinograph value of about 10 to 22 minutes.

6. The method of claim 5 wherein the steamed and toasted oat groats have a ratio of a) peak acid to b) ferulic acid peak of $\geq 3.5$.

7. The method of claim 1 additionally comprising the step of:
   C. milling the steamed and toasted oat groats to form a whole grain oat flour.

8. The method of claim 7 wherein the steamed and toasted oat groats have a Farinograph value of about five to 25 minutes.

9. The method of claim 8 wherein the steamed and toasted oat groats have a ratio of a) syringic acid peak to b) ferulic acid peak of $\geq 2.5$.

10. The method of claim 1 additionally comprising the step of:
    C. milling the steamed and toasted oat groats to form a whole grain oat flour.

11. The method of claim 10 wherein the steamed and toasted oats have a Farinograph value of about five to eight minutes.

12. The method of claim 11 additionally comprising the steps of:
    D. combining the improved oat flour (24) with water (27), salts and R-T-E cereal ingredients;
    E. cooking in a cooker 26 to form a cooked whole grain oat cooked cereal dough 28; and
    F. forming the cooked cereal dough 28 into a finished whole oat R-T-E cereal.

13. The method of claim 12 wherein step F comprises the substeps of:
    1) forming the dough (28) into pellets,
    2) drying the pellets to a moisture content of about 8 to 14% in a pellet dryer 32.

14. The method of claim 13 wherein step F additionally comprises the substep of:
    3) puffing the dried pellets to form puffed whole oat puffed pieces (43).

15. The method of claim 14 wherein step F additionally comprises the substep of:
    4) toasting the puffed pieces to further develop a toasted oat flavor to form toasted oat puff pieces 45.

16. The method of claim 14 wherein step F additionally comprises the substeps of:
    3) flaking the pellets to form wet oat flakes having a moisture content of about 12 to 18%, and
    4) toasting the flakes to form toasted oat flakes.

17. The method of claim 12 wherein in step E the cooking is continued for about 0.5 to eight minutes in a single or twin screw cooker extruder to form a cooked cereal dough having a moisture content of about 12 to 35%.

18. The method of claim 16 wherein in step E the cooking is continued for about 0.5 to eight minutes in a single or twin screw cooker extruder to form a cooked cereal dough having a moisture content of about 12 to 35%.

19. The method of claim 17 wherein step F comprises the substep of directly expanding the cooked cereal dough to form puffed R-T-E cereal pieces.

20. The method of claim 19 wherein the puffed piece is ring shaped.

21. The method of claim 20 wherein step F additionally comprises the substep of drying the puffed piece to a moisture content of about 2 to 6%.

22. The method of claim 13 wherein in step E the cooking is continued for about 30 to 70 minutes at 93° to 110° C. to form a cooked cereal dough having a moisture content of about 12 to 35%.

23. The method of claim 22 wherein step F additionally comprises (3) gun puffing the pellets to form puffed whole oat puffed R-T-E cereal pieces.

24. The method of claim 23 wherein step F additionally comprises the substep of toasting the puffed whole oat puffed R-T-E cereal pieces.

25. The method of claim 24 wherein the puffed piece is ring shaped.

26. The product prepared by the process of claim 1.

27. The product prepared by the process of claim 12.

28. The product prepared by the process of claim 24.

29. An improved oat groat product, comprising:
steamed and toasted oat groats having a Farinograph value of about five to 25 minutes and having a ratio of a) syringic acid peak to b) ferulic acid peak of $\geq 2.5$.

30. The oat groat product of claim 29 wherein the steamed and toasted oat groats have a Farinograph value of about five to eight minutes.

31. The oat groat product of claim 30 wherein the steamed and toasted oat groats have a Farinograph value of about 10 to 22 minutes.

32. An improved whole grain oat flour comprising:
milled whole oat groats
  1) a Farinograph value of about five to 25 minutes,
  2) a ratio of a) syringic acid peak to b) ferulic acid peak of $\geq 2.5$, and
  3) a negative peroxidase activity.

33. The improved oat flour of claim 16 having a Farinograph value of about five to eight minutes.

34. The improved oat flour of claim 15 having a Farinograph value of about 10 to 22 minutes, and a ratio of syringic acid peak to ferulic acid peak of $\geq 3.5$.

35. A method according to claim 7 comprising:
combining the whole grain oat flour with other R-T-E cereal ingredients to form an R-T-E cereal ingredient mixture; and extruding the R-T-E cereal ingredient mixture to form a finished whole oat R-T-E cereal.

36. An R-T-E cereal product formed according to the method of claim 35.

* * * * *